April 16, 1963    H. PEARSON    3,085,345
ANGLE MEASURING AND INDICATING DEVICE
Filed July 17, 1961
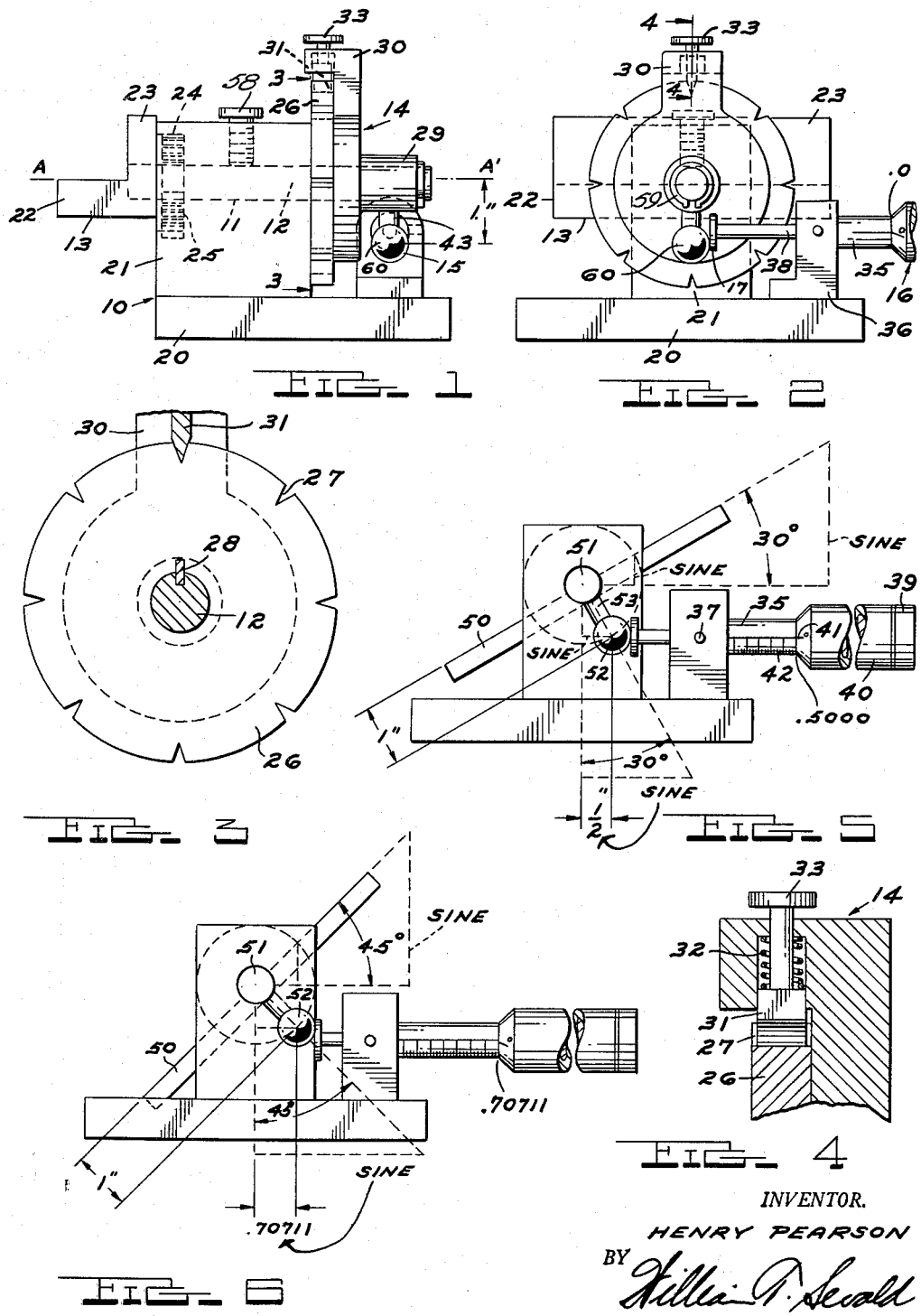
INVENTOR.
HENRY PEARSON
BY
ATTORNEY

United States Patent Office 3,085,345
Patented Apr. 16, 1963

3,085,345
ANGLE MEASURING AND INDICATING DEVICE
Henry Pearson, Detroit, Mich., assignor of one-half to William T. Sevald, Royal Oak, Mich.
Filed July 17, 1961, Ser. No. 124,502
4 Claims. (Cl. 33—174)

This invention relates to an angle measuring device which gives the reading of the measured angle up to 45 degrees in terms of its sine function valuation.

Angle measuring devices have been employed heretofore to facilitate the direct measuring of an angle, however, the several devices of the prior art have not proven entirely satisfactory inasmuch as they are complicated in design and construction, expensive to manufacture, and difficult to use.

With the foregoing in view, the primary object of the invention is to provide an angle measuring device which is simple in design and construction, inexpensive to manufacture, easy to use, and easy to maintain.

An object of the invention is to provide an angle measuring device which gives the reading of the angle measured in the trigonometric function value of the sine of the angle measured up to 45 degrees so that in determining an angle, it is only necessary to adjust the device to the angle and read the decimal indication in the trigonometric function value tables, or, conversely, it is only necessary to set the trigonometric value of the sine on the scale to establish a desired angle.

These and other objects of the invention will become apparent by reference to the following description of an angle measuring device embodying the invention taken in connection with the accompanying drawing in which:

FIG. 1 is a side elevational view of an inventive device.

FIG. 2 is a right end elevational view of the device seen in FIG. 1.

FIG. 3 is an enlarged cross-sectional view of FIG. 1 taken on the line 3—3 thereof.

FIG. 4 is an enlarged cross-sectional view of FIG. 2 taken on the line 4—4 thereof.

FIG. 5 is a view similar to FIG. 2 showing a modified device at a different angle and reading.

FIG. 6 is a view similar to FIG. 5 showing a different angle and reading; and

FIG. 7 is a table showing the sine values of the trigonometric functions for angles from zero to forty five degrees.

Referring now to the drawing wherein like numerals refer to like and corresponding parts throughout the several views, the angle measuring device disclosed therein to illustrate the invention comprises a stand 10 having a bore 11 rotatably housing the shaft 12 which carries the measuring plate 13 at one end and the radial arm assembly 14 at the other end so that the arm 43 makes the same angular movement as the plate 13 when the shaft 12 rotates and the angular movement of an arcuate sector in the ball 15 is read on the micrometer assembly 16 as the sector is in engagement with the micrometer anvil 17 and due to the fact that the center of the arcuate sector on the ball 15 is one inch from the axis of the shaft 12 and the micrometer is calibrated in decimals of one inch, the micrometer reading indicates the trigonometric sine value of the angular position of the arm 45 and plate 13 so by converting the reading of the micrometer 16 via trigonometric function value tables the angular position of the plate 13 is determined in degrees and minutes.

More particularly, the preferred embodiment of the device shown in FIGS. 1 through 4 has a base 20 and a pillar 21 making up the stand 10 and the plate 13 is comprised of a horizontal plate 22 and a vertical plate 23 at 90 degrees to one another. The pillar 21 has a chamber 24 housing the coil spring 25 which resiliently urges the shaft 12 in an angular counter-clockwise direction so as to resiliently urge the ball 15 against the micrometer anvil 17 to maintain the engagement.

The arm assembly 14 comprises a notched disc 26 having eight notches 27 located at the quadrants and half quadrants and the disc 26 is fixed on the shaft 12 such as by the key 28, welding, or otherwise. The hub 29 is freely rotatably disposed on the shaft 12 and is equipped with a boss 30 carrying the spring pressed plunger 31 which is moved radially inwardly by the spring 32 so as to releasably engage a notch 27 of the disc 26 and the plunger 31 is equipped with a head 33 so that the operator can move the plunger radially outwardly of the disc notch 27 for adjusting the quadrant in which measurements are to be made relative to the plate 13. The snap ring 59 lies in a groove of the shaft 12 and holds the hub on the shaft 12 and since the plate 13 is fixed on the other end of the shaft, the device is held in assembly and the angular position of the shaft is secured by the thumb screw 58.

The micrometer assembly 16 comprises a barrel 35 fixed on the bracket 36 on the stand 10 by the set screw 37 and the micrometer anvil 17 is supported by the spindle 38 which is threadably located in the micrometer barrel 35. The spindle 38 is collet-wise attached to the jam nut 39 which is frictionally engaged with the thimble 40 which carries the scale 41 which is read against the scale 42 on the micrometer barrel 35.

It is to be noted that the ball 15 is mounted on the hub 29 via the arm 43 so that the center of the ball 15 is exactly one inch from the axis of the shaft 12 and with this condition, the sidewise linear movement of the ball relative to the micrometer anvil 17 at its arc is the distance equal to the trigonometric function value of the sine and it will be noted that in the initial position of FIG. 2 with the table 13 at zero angle the micrometer reads zero; in the embodiment of FIG. 5 the micrometer reads .500 which is the sine value of the 30 degree angle measured; and in FIG. 6 the micrometer reads .70711 which is the sine value for the 45 degree angle measured.

In FIGS. 5 and 6 the table 50 is fixed on one end of the shaft 51 and the ball 52 is directly mounted on the shaft via the arm 53. In FIGS. 1 through 4 the arm and plate are adjustable to one another for quadrant selection.

The inventive angle measuring device is directly readable in terms of the trigonometric function value of the sine of the angle measured as the shaft 12 axis constitutes a trigonometric center and the angle plate 13 on the shaft 12 has a surface disposed in a radial plane relative to the shaft 12 with the plate 13 providing means for measuring and indicating angles relative to a work piece. The radial arm 43 on the shaft is at a known angle to the plate 13 and the arm 43 has a unit length extending from an inner end at the shaft 12 axis to a radially outer end 60 with the arm axis having an angular initial starting position at zero degrees angle and the arm 43 being adapted to swing in a direction from zero to a new angular position up to 45 degrees relative to its initial starting position.

The sector of the ball 15 on the arm 43 is arcuate to the outer end 60 of the arm 43 and lies in the plane of arm rotation and extends on the swing direction side of the arm axis. The micrometer 16 lies on the swing direction side of the arm 43 in the plane of arm rotation and has an axis disposed at a right angle to the arm 43 axis when the arm is in initial starting angular position with the anvil 17 riding the arm ball sector and has a scale 41—42 in decimals of unit length registering zero as the trigonometric value of the sine of zero angle when the arm 43 axis is in initial starting zero angular position.

The sector of the ball 15 provides an accurate extension of the arm 43 outer end 60 relative to the anvil 17 for indicating movement of the arm outer end 60 so that the micrometer measures the right angle distance of movement of the outer end of the arm 60 on the arc of its swing via the sector and anvil from its initial starting zero angular position to its new angular position by directly measuring the sine distance extension as a decimal of unit length with the micrometer scale decimal measurement reading being the same as the trigonometric function value of the sine of the angle described by the arm axis in its new angular position relative to its initial starting angular position. The angular position of the plate 13 surface relative to a work piece is established by adjusting the known angular relationship between the arm axis and the plate surface in combination with the angle indicated by the micrometer scale reading converted via trigonometric function value tables.

The novel measuring device with these features constitutes a compact, durable, and accurate mechanism easily operated to measure angles with a minimum of equipment, effort, and time.

Although but two embodiments of the invention have been shown and described in detail, it is obvious that many changes may be made in the size, shape, detail, and arrangement of the various elements of the invention within the scope of the appended claims.

I claim:

1. An angle measuring device directly readable in terms of the trigonometric function value of the sine of the angle measured comprising, a stand having a bore, a shaft rotatably disposed in said bore and having an axis; said shaft axis constituting a trigonometric center; an angle plate on said shaft having a surface disposed in a radial plane relative to said shaft; said plate providing means for measuring and indicating angles relative to a work piece; a radial arm on said shaft at an adjustable, known angle to said plate; said arm having an axis and a unit length and extending from an inner end at said shaft axis to a radially outer end; said arm axis having an angular initial starting position and said arm being adapted to swing counter-clockwise to a new angular position relative to its initial starting position; a circular sector having its center on the arm axis and fixed to said outer end of said arm and lying in the plane of arm rotation and extending on the counter-clockwise side of said arm axis, a micrometer on said stand fixed lying on the counter-clockwise side of said arm in the plane of arm rotation, said micrometer having an axis disposed at a right angle to said arm axis when said arm is in initial starting angular position and having an anvil riding said arm sector and having a scale in decimals of unit length and registering zero as the trigonometric function value of the sine of zero angle when said arm axis is in the initial starting angular position; said sector providing an accurate extension of said arm outer end relative to said anvil for indicating movement of said arm axis outer end; said micrometer measuring the counter-clockwise right angle distance of movement of the outer end of said arm axis on the arc of its swing via said sector and anvil from its initial starting angular position to its counter-clockwise new angular position and directly indicating the trigonometric function value of the sine of the angle described by said arm axis in its new angular position relative to its initial starting angular position; the angle of said plate surface relative to a work piece being established by the known angular relationship between said arm axis and said plate surface in combination with the angle indicated by said micrometer scale reading.

2. An angle measuring device directly readable in terms of the trigonometric function value of the sine of the angle measured comprising, a stand having a bore, a shaft rotatably disposed in said bore and having an axis; said shaft axis constituting a trigonometric center; an angle plate on said shaft having a surface disposed in a radial plane relative to said shaft; said plate providing means for measuring and indicating angles relative to a work piece; a radial arm on said shaft at an adjustable known angle to said plate; said arm having an axis and unit length and extending from an inner end at said shaft axis to a radially outer end; said arm axis having an angular initial starting position and said arm being adapted to swing in a direction to a new angular position relative to its initial starting position; a circular sector having its center on the arm axis and fixed to said outer end of said arm and lying in the plane of arm rotation and extending on the swing direction side of said arm axis, a micrometer fixed with respect to said stand and lying in the plane of arm rotation having an axis disposed at a right angle to said arm axis when said arm is in initial starting angular position and having an anvil riding said arm sector and having a scale in decimals of unit length registering zero as the trigonometric function value of the sine of zero angle when said arm axis is in initial starting angular position; said sector providing an accurate extension of said arm axis outer end relative to said anvil for indicating movement of said arm axis; said micrometer measuring the right angle distance of movement of the outer end of said arm axis on the arc of its swing via said sector and anvil from its initial starting angular position to its new angular position by directly indicating the trigonometric function value of the sine of the angle described by said arm axis in its new angular position relative to its initial starting angular position; the angular position of said plate relative to a work piece being established by adjusting the known angular relationship between said arm axis and said plate in combination with the angle indicated by said micrometer scale reading.

3. In a device as set form in claim 2, a sleeve disposed on said shaft between said angle plate and said arm for angularly adjusting said plate and arm relative to one another, and means for securing said sleeve relative to said shaft to secure said plate relative to said arm in the adjusted position.

4. In a device as set forth in claim 2, said angle plate having a second surface normal to said surface disposed in a radial plane providing means for accurately locating a work piece in a circumferential plane parallel to the circumferential plane of rotation of said arm.

References Cited in the file of this patent

UNITED STATES PATENTS

| | | |
|---|---|---|
| 1,428,509 | Weingar | Sept. 5, 1922 |
| 2,373,578 | Lewis | Apr. 10, 1945 |
| 2,645,026 | Trbojevich | July 14, 1953 |
| 2,807,884 | Tutle | Oct. 1, 1957 |
| 2,812,586 | Matthews | Nov. 12, 1957 |